US012133095B2

United States Patent
Ahmed et al.

(10) Patent No.: US 12,133,095 B2
(45) Date of Patent: Oct. 29, 2024

(54) MACHINE LEARNING-BASED APPROACHES FOR SERVICE FUNCTION CHAIN SELECTION (71) Applicant: HEWLETT PACKARD ENTERPRISE DEVELOPMENT LP, Houston, TX (US)

(72) Inventors: Faraz Ahmed, Milpitas, CA (US); Lianjie Cao, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 561 days.

(21) Appl. No.: 17/503,232

(22) Filed: Oct. 15, 2021

(65) Prior Publication Data

US 2023/0123074 A1 Apr. 20, 2023

(51) Int. Cl.
*H04W 24/02* (2009.01)
*G06N 7/01* (2023.01)
(Continued)

(52) U.S. Cl.
CPC ............. *H04W 24/02* (2013.01); *G06N 7/01* (2023.01); *G06N 20/00* (2019.01); *H04W 4/50* (2018.02);
(Continued)

(58) Field of Classification Search
None
See application file for complete search history.

(56) References Cited

U.S. PATENT DOCUMENTS 10,826,797 B2 * 11/2020 Kim ................... G06F 9/45558
11,831,540 B2 * 11/2023 Bharti ................... H04L 67/562
(Continued)

OTHER PUBLICATIONS

"Ericsson mobility report," https://www.ericsson.com/4adc87/assets/local/reports-papers/mobility-report/documents/2020/november-2020-ericsson-mobility-report.pdf, Nov. 2020, pp. 1-36.
(Continued)

*Primary Examiner* — Marcus Smith
*Assistant Examiner* — Gautam Sharma
(74) *Attorney, Agent, or Firm* — Sheppard Mullin Richter & Hampton LLP (57) ABSTRACT

Systems, methods, and computer-readable media are described for employing a machine learning-based approach such as adaptive Bayesian optimization to learn over time the most optimized assignments of incoming network requests to service function chains (SFCs) created within network slices of a 5G network. An optimized SFC assignment may be an assignment that minimizes an unknown objective function for a given set of incoming network service requests. For example, an optimized SFC assignment may be one that minimizes request response time or one that maximizes throughput for one or more network service requests corresponding to one or more network service types. The optimized SFC for a network request of a given network service type may change over time based on the dynamic nature of network performance. The machine-learning based approaches described herein train a model to dynamically determine optimized SFC assignments based on the dynamically changing network conditions.

15 Claims, 6 Drawing Sheets (51) Int. Cl.
*G06N 20/00* (2019.01)
*H04W 4/50* (2018.01)
*H04W 24/10* (2009.01)
*H04W 40/12* (2009.01)
*H04W 48/18* (2009.01)

(52) U.S. Cl.
CPC .......... *H04W 24/10* (2013.01); *H04W 40/12* (2013.01); *H04W 48/18* (2013.01)

(56) References Cited

U.S. PATENT DOCUMENTS

| | | | | |
|---|---|---|---|---|
| 11,936,758 | B1* | 3/2024 | Wang | H04L 41/122 |
| 2016/0094667 | A1* | 3/2016 | Jani | G06F 9/4411 |
| | | | | 709/202 |
| 2017/0094002 | A1* | 3/2017 | Kumar | H04L 67/1097 |
| 2017/0126792 | A1* | 5/2017 | Halpern | H04L 67/1001 |
| 2018/0091410 | A1* | 3/2018 | Browne | H04L 41/5009 |
| 2018/0349202 | A1* | 12/2018 | Sharma | H04L 47/827 |
| 2020/0007445 | A1* | 1/2020 | Anwer | H04L 41/40 |
| 2020/0145336 | A1* | 5/2020 | Shao | H04L 47/2441 |
| 2020/0167190 | A1* | 5/2020 | Bernat | G06F 9/4881 |
| 2020/0167610 | A1* | 5/2020 | Hong | G06F 18/217 |
| 2021/0385159 | A1* | 12/2021 | Mehmedagic | H04L 67/133 |
| 2022/0121504 | A1* | 4/2022 | Vidal | G06F 9/4831 |

OTHER PUBLICATIONS

Ahmed, F., et al., "Optimizing internet transit routing for content delivery networks," IEEE/ACM Transactions on Networking, vol. 26, Issue 1, Feb. 2018, pp. 10.

Boguovic, I., et al., "Time-varying gaussian process bandit optimization," in PMLR AISTATS, Jan. 25, 2016, pp. 20.

Chen, X., et al., "Reinforcement learning{based qos/qoe-aware service function chaining in software-driven 5g slices," Transactions on Emerging Telecommunications Technologies, vol. 29, No. 2, Apr. 6, 2018, pp. 14.

Chua, F. C., et al., "Stringer: Balancing latency and resource usage in service function chain provisioning," IEEE Internet Computing, vol. 20, Issue 6, May 2016, pp. 22-31.

Garg, G., et al., "Davis: A delay-aware vnf selection algorithm for service function chaining," IEEE Comsnets, Jan. 1, 2019, pp. 436-439.

Samsung, "Network slicing," Technical White Paper, 2020. pp. 22.

Santos, L, G., et al., "Using reinforcement learning to allocate and manage service function chains in cellular networks," arXiv, Vo. 1, Jun. 12, 2020, pp. 9.

Tootaghaj, D. Z., et al., "Homa: An efficient topology and route management approach in sd-wan overlays," IEEE INFOCOM, Jul. 1, 2020, pp. 23.

Wei-Kun, C., et al., "Optimal network slicing for service-oriented networks with flexible routing and guaranteed e2e latency," arXiv, vol. 1, Jun. 5, 2021, pp. 1-16.

* cited by examiner

MACHINE LEARNING-BASED APPROACHES FOR SERVICE FUNCTION CHAIN SELECTION

BACKGROUND

Recent advances in containerization and microservices enable flexible orchestration of services in 5G mobile networks, which are designed to embrace numerous services with varied service-level requirements (SLRs). 5G network slicing is a network architecture that enables the multiplexing of virtualized and independent logical networks on the same physical network infrastructure. 5G network slicing leverages the concepts of software-defined networking (SDN) and network function virtualization (NFV) to implement flexible and scalable network slices—each with its own service level agreement (SLA)—on top of a common network infrastructure.

BRIEF DESCRIPTION OF THE DRAWINGS

The present disclosure, in accordance with one or more various aspects, is described in detail with reference to the following figures. The figures are provided for purposes of illustration only and merely depict typical or example aspects.

The figures are not exhaustive and do not limit the present disclosure to the precise form disclosed.

DETAILED DESCRIPTION

Mobile network data traffic is growing at an exponential rate. This trend is expected to continue as communication service providers (CSPs) continue shifting towards 5G technology. It is expected that nearly half of all global mobile data traffic will be carried by 5G networks by 2025. The adoption of 5G technology enables many services and applications that prior generation network infrastructure could not reliably support such as enhanced mobile broadband (eMBB) for augmented reality (AR)/virtual reality (VR) applications, ultra-reliable low-latency communications (URLLC) for autonomous vehicles, and massive machine-type communications (mMTC) for industrial Internet of Things (IoT) applications, or any other application having stringent Quality of Service (QoS) requirements.

Applications, such as those noted above, may have disparate network SLRs for bandwidth, latency, mobility, and reliability. To provide guaranteed services, network slicing has been introduced in 5G. Network slicing allows for individual control of quality-of-service (QoS) to ensure that service-level objectives (SLOs) defined in service-level agreements (SLAs) are met for each application. More specifically, network slicing allows CSPs to operate different services with embedded SLAs by leveraging concepts such as NFV and SDN to virtualize and decompose the 5G network functions into microservices.

More specifically, in 5G technology, network functions can be virtualized and decomposed into smaller virtual network functions (VNFs) running as microservices on a shared physical infrastructure, which may include a 5G radio access network (RAN) and a core network. CSPs may then deploy the 5G VNFs in containers using orchestration engines. In particular, a CSP can dynamically create a network slice that meets the SLOs of an end-to-end SLA. A network slice can include VNFs that are dedicated to the network slice and/or VNFs shared among multiple network slices.

When incoming network flows are received, various instances of VNFs within a network slice are selected to form a service function chain (SFC) to serve the incoming flows. An SFC may be a chain of dedicated and/or shared VNFs within a network slice that together are capable of meeting SLAs of an incoming network service request. Given the dynamic nature of network flows, SFCs may be scaled and/or replicated to ensure that end-to-end SLOs are met. In particular, multiple SFCs may be created to meet dynamic workload demands by chaining together different sets of customized, replicated, and/or scaled VNFs. As such, multiple SFCs within a given network slice represent different end-to-end paths for servicing an incoming network flow, and thus, can be viewed as replicated SFCs.

Depending on the network service type, VNFs of a corresponding network slice that services the network service type may be placed across hierarchical data centers (DCs). Because VNF instances are placed across multiple DCs—with each VNF instance having a different capacity depending on the amount of provisioned resources—different SFCs formed from those VNF instances may also have different capacities for handling requests associated with a given network service type. As such, proper selection of SFCs that are capable of meeting predefined SLOs is desired. For instance, an application having stringent end-to-end latency requirements, such as an autonomous vehicle application associated with the URLLC network service type, may call for selection of a particular SFC having the capacity to reliably meet such stringent requirements.

SFC management has in the past been performed within a generic NFV context based on virtual machines (VMs). In particular, constituent VNFs of a SFC are deployed in VMs that are managed by a hypervisor running on bare metal servers. As such, existing work relating to SFC orchestration has focused on VM-based NFV infrastructure. For example, a reinforcement learning-based approach has been proposed to manage VNFs of an SFC in cellular networks in order to reduce packet loss and energy consumption by creating, deleting, and restarting VNFs of the SFC in different DCs. Another reinforcement learning-based approach has been proposed that measures QoS and seeks to optimize SFC provisioning to achieve better QoS by piggybacking on QoS metrics present in Link Layer Discovery Protocol (LLDP) packets. In this approach, the QoS information is used as input to a multi-armed bandit-based approach for VNF selection. Yet another proposed approach seeks to reduce resource usage and latency by attempting to optimize VNF placement in an SFC. Still further, a heuristic-based approach has been proposed that seeks to optimize SFC throughput by including CPU utilization of VNFs as a variable when selecting VNFs.

The above-described approaches, however, suffer from a number of technical problems. For instance, they focus on packet-level information collected by a separate measurement system, which not only incurs extra overhead, but also makes it difficult to maintain end-to-end application-level SLOs for 5G network slices using such low-level telemetry information. In addition, the above-described approaches were not designed for 5G systems, and thus, are unable to take advantage of the latest advances of the containerized microservice design in 5G networks. Still further, these approaches are unable to account for dynamic changes to the end-to-end network performance, and as such, cannot ensure that the most optimal SFC is selected to handle a given incoming network request.

Due to the dynamic nature of end-to-end network performance and the varying performance characteristics of SFCs over time, even though a particular SFC may exhibit the best performance with respect to a particular performance parameter during one time period, that same SFC may not exhibit the best performance with respect to that performance parameter during another time period. A performance parameter may include any metric of interest that serves as a measure of network performance. Performance parameters may include, without limitation, request response time, latency, packet loss, throughput, and so forth. Depending on the type of parameter, it may be desirable to maximize the parameter (e.g., throughput) or minimize the parameter (e.g., request response time, latency, packet loss, etc.).

As a non-limiting example, consider the request response time performance parameter. A first SFC may be assigned to a first network service request in a first set of incoming network service requests received during a first period of time. The first SFC may be assigned to handle the first request because it may offer the lowest request response time during the first time period compared to other SFCs. In particular, various network service requests relating to various network service types may be received from various applications executing on client devices, for example, over the course of a first period of time. The set of incoming network service requests may be batched together for the purpose of a making an SFC assignment, whereby a respective SFC is selected to handle each service request (the terms "network service request," "network request," "service request," or simply "request" may be used interchangeably herein). For instance, after some threshold number of requests are received, an SFC assignment may be made.

At some later point in time, however, the first SFC may no longer exhibit the lowest request response time. In fact, performance of the first SFC with respect to the request response time parameter may become so diminished at some point that it is no longer capable of satisfying the SLOs for requests associated with one or more network service types. Existing SFC selection techniques are not capable of accounting for this dynamic nature of network performance of SFCs. In particular, in the example scenario above, existing SFC selection techniques may assign the first SFC to a second request among a second set of incoming network service requests received during a second period of time subsequent to the first time period, despite the first SFC no longer exhibiting the best request response time, and despite the assignment of the first SFC to the second request potentially violating the SLA requirements of the network service type of the request. Existing SFC selection techniques might compensate for this detected poor performance by instructing the resource manager to allocate more resources for VNF instances forming part of the first SFC. This, however, could have the unintended negative consequence of diminishing the performance of other SFCs.

Stated another way, existing SFC selection techniques are unable to determine which SFC may be an optimal choice for a given network service request at a given point in time. As a result, existing SFC techniques run the risk of assigning—to a network service request of a given network service type—an SFC that no longer exhibits the best performance with respect to a performance parameter of interest, and that potentially violates the SLAs/SLOs of that network service type during one or more periods of time. Aspects of the disclosed technology solve this technical problem by employing a machine learning-based optimization algorithm to train a machine learning model to dynamically select SFCs that are optimized to handle incoming flows. A network slice manager can then utilize the trained machine learning model to dynamically assign SFCs to incoming network requests in a manner that ensures that SLOs are met and resources are utilized efficiently. Further, example aspects of the disclosed technology utilize a service mesh layer to perform the SFC selection in a non-intrusive manner in accordance with current 5G standards. While 5G networks may contain information about network slices such as slice identifiers, service type, and slice QoS/SLO features that could be used to select different types of network slices for different devices, existing SFC selection techniques are not able to dynamically and efficiently assign SFCs within the same logical network slice to different incoming network service requests in a manner that optimizes a selected network performance parameter.

More specifically, according to some aspects of the disclosed technology, detailed telemetry information (e.g., single response time, request counts, distributed tracing, etc.) is collected by sidecar proxies inserted into VNF containers. A machine learning optimization algorithm is then trained based on the telemetry data to perform adaptive SFC selection. More specifically, in some aspects, adaptive Bayesian optimization is employed to learn over time the most optimized assignments of SFCs to incoming network requests. In some aspects, an optimized SFC assignment may be one that minimizes an unknown objective function for a given set of network requests received at time t. In some aspects, resource utilization information can also be considered when selecting SFCs that compete for resources of the same infrastructure. Further, in some aspects, the SFC selection decision may be translated to service mesh routing policies and deployed to sidecar proxies without requiring any modification to existing 5G standards.

Due to the stateless design of the network slices, incoming requests of a user session are not required to be handled by the same set of VNF instances. Rather, an SFC can dynamically share different segments (e.g., different VNF instances) with other SFCs in the same network slice such that workload traffic can be routed through any of the SFCs. Different SFCs, however, may exhibit significantly different end-to-end QoS values, which can adversely impact the assurance of end-to-end SLOs by the network slice. Thus, aspects of the disclosed technology leverage the stateless design of network slices to dynamically select an optimized assignment of SFCs to incoming requests received over the course of given period of time, and modify that assignment for a later set of received network service requests if the machine learning algorithm disclosed herein identifies a different SFC assignment as an optimized assignment for the later received set of requests.

Figure 1:
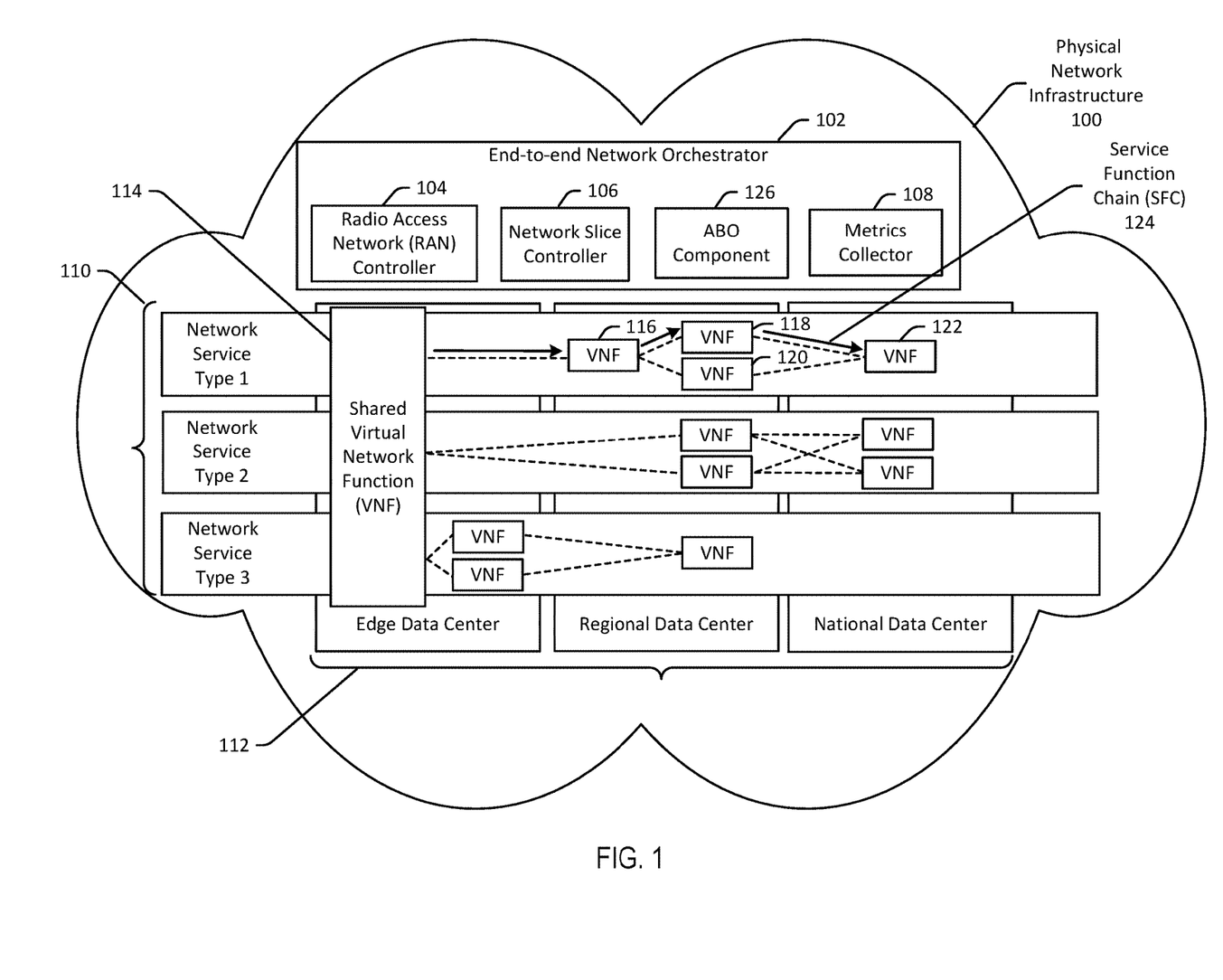
FIG. 1 is a schematic diagram depicting a network architecture for implementing aspects of the disclosed technology.

FIG. 1 schematically depicts a network architecture within which aspects of the disclosed technology can be implemented. FIG. 1 illustrates how multiple network slices 110 can be created to respectively serve multiple types of network services. The network service types may include, without limitation, any of the example types of services noted above (e.g., eMMB, mMTC, ULRRC, etc.). FIG. 1 illustratively depicts three network slices 110 created across edge DCs, regional DCs, and national DCs 112. A network slice can include VNFs that are dedicated to the network slice (e.g., VNF 116) and/or VNFs shared among multiple network slices (e.g., VNF 114). When incoming network flows are received, various instances of VNFs within a network slice may be selected to form an SFC to serve the incoming flows. Multiple SFCs within a given network slice may represent different end-to-end paths for servicing an incoming network flow. For instance, in some scenarios, a VNF instance can be replicated, and different SFCs can be created by forming chains that include different replicated instances of the same VNF. For instance, as illustrated in FIG. 1, for an incoming flow associated with network service type 1, an SFC 124 within the network slice that services that network service type may be selected to handle the incoming flow. SFC 124 may be formed by chaining shared VNF 114 with instances of VNFs 116, 118, and 122. Alternatively, another SFC that forms a different end-to-end path than SFC 124 may be assigned to the incoming flow. For instance, an SFC formed by chaining together VNFs 114, 116, and 122 with replicated VNF instance 120 rather than VNF instance 118 may be selected. Thus, network slicing in 5G networks allows operators to dynamically create and scale end-to-end services for different types of network traffic.

As depicted in FIG. 1, the network slices 110 and the SFCs that are formed from chaining together various VNF instances within network slices operate on a shared physical network infrastructure 100. The physical infrastructure 100 may include RAN and core networks of a 5G network, for example. An end-to-end network orchestrator 102 may be provided to manage the network slices, and in particular, to manage the creation of VNF instances, the formation of SFCs from chained VNF instances, and the selection of SFCs to handle various incoming network flows. The orchestrator 102 may include, for example, a RAN controller 104, a network slice controller 106, a metrics collector 108, and an adaptive Bayesian optimization (ABO) component 126. The RAN controller 104 may be configured to manage network traffic across the RAN. The network slice controller 106 may be configured to manage the various network slices including the creation of VNF instances (e.g., replication/scaling of VNFs); the creation of SFCs from chained VNF instances; and the selection of SFCs to handle incoming network flows. The metrics collector 108 may be configured to collect various telemetry data relating to the handling of incoming flows by various SFCs. The telemetry data may include, for example, performance metrics such as end-to-end latency, QoS metrics, or the like. The ABO component 126 may be configured to implement machine learning algorithm(s) that enable the determination of optimized SFC assignments for incoming network service requests, in accordance with aspects of the disclosed technology. While the ABO component 126 is shown as part of the orchestrator 102, the ABO component 126 may sit elsewhere in the network architecture in other implementations.

Figure 2:
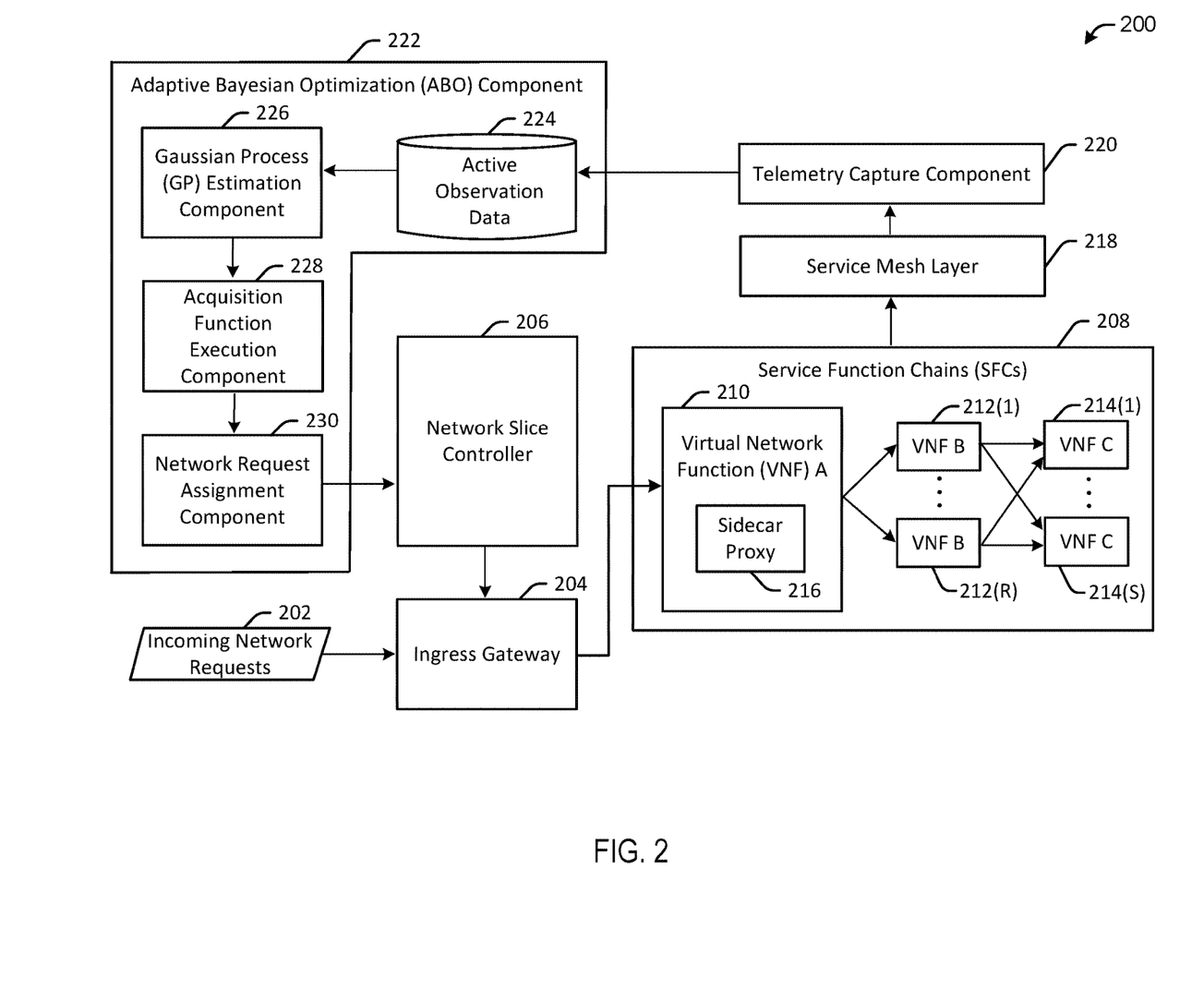
FIG. 2 is a schematic diagram of a system architecture configured to employ a machine learning-based approach to optimize service function chain (SFC) selection for incoming network flows according to example aspects of the disclosed technology.

FIG. 2 is a schematic diagram of a system architecture 200 configured to employ a machine learning-based approach to optimize SFC selection for incoming network requests 202 according to example aspects of the disclosed technology. In example embodiments, the incoming network requests 202 may be received at an ingress gateway 204. A network slice controller 206—which may be a particular implementation of the network slice controller 106—may receive an assignment of the network requests 202 to a set of SFCs 208 and may update routing policies to reflect the assignment. The network slice controller 206 may communicate the SFC assignment and the routing policies to the ingress gateway 204, which may be configured to tag the requests 202 accordingly so as to enable network policy enforcement during handling of the requests 202 by the assigned SFCs 208.

As described earlier, various SFCs 208 may be formed by chaining together various VNF instances. The VNF instances may include VNF instance(s) that are shared across multiple network slices (e.g., VNF A 210) and/or VNF instances that are replicated within a given network slice. VNF B, for example, is shown as being replicated to obtain VNF B instances 212(1)-212(R). Similarly, VNF C is shown as being replicated to obtain VNF C instances 214(1)-214(S). R and S can be any integers greater than or equal to 2. Various SFCs may be formed by chaining together these various shared and/or replicated VNF instances. For instance, an SFC may be formed by chaining together VNF 210 (VNF A), a particular instance of VNF B (e.g., VNF 212(1)), and a particular instance of VNF C (e.g., 214(1)). As another non-limiting example, another SFC may be formed from chaining VNF 210 (VNF A), another instance of VNF B (e.g., VNF 212(3)), and another instance of VNF C (e.g., VNF 214(2)). In some embodiments, each VNF instance may include a respective sidecar proxy/ For example, a sidecar proxy 216 is illustratively depicted as being provided within the container that includes VNF A 210. The sidecar proxy 216 may be an application design pattern that abstracts certain features, such as inter-service communications, monitoring, and security, away from the main architecture to ease the tracking and maintenance of an application as a whole.

As noted, the network slice controller 206 may define network routing policies and may update the routing policies to reflect an assignment of the set of incoming requests 202 to a selected set of SFCs 208. The policies may be deployed on the various sidecar proxies of the VNF instances forming part of the selected set of SFCs 208 (e.g., sidecar proxy 216). In example aspects, the policies may be implemented using a control plane of a service mesh layer 218. In particular, using application programming interfaces (APIs) provided by the control plane of the service mesh layer 218, fine-grained load balancing and routing policies can be defined, secure application communication with authentication and authorization is enabled, and detailed application-level metrics, logs, and traces can be automatically collected. More generally, the service mesh layer 218 may be configured to facilitate service-to-service communications for microservice-based applications running on container platforms. The data plane of the service mesh layer 218 may be implemented as an infrastructure layer that inserts layer proxies as sidecar proxies (e.g., sidecar proxy 216) to application containers. In an example aspect, the service mesh layer 218 can be implemented using Istio.

The architecture 200 may further include a telemetry capture component 220, which may be a specialized software and/or hardware module configured to monitor network conditions and generate telemetry data relating thereto. For instance, the telemetry capture component may obtain detailed telemetry data relating to various network performance metrics associated with requests handled by various SFCs 208. In particular, for any given assignment of an incoming request 202 to an SFC 208, the telemetry capture component 220 may obtain, via the service mesh layer 218, telemetry information about the performance of the SFC in terms of SLOs and other key performance indicators (KPIs). The observed performance and detailed telemetry data captured by the telemetry capture component 220 may be fed to an ABO component 222, which may be a particular implementation of the ABO component 126.

In example aspects, the ABO component 222 maintains a repository 224 (e.g., any suitable data store such as a relational database, a cloud database, an object-oriented database, or the like) of an active set of observations that it uses to model SFC performance. The ABO component 222 further includes a Gaussian Process (GP) estimation component 226 that utilizes Gaussian processes to model SFC performance. The GP model generated by the GP estimation component 226 may then be used by an acquisition function execution component 228 configured to execute an acquisition function based on the GP model to find the next optimized assignment of requests to SFCs. The ABO component 222 may further include a network request assignment component 230 configured to communicate the optimized network request-to-SFC assignment to the network slice controller 206. The controller 206 may then relay the assignment information to the ingress gateway 204, which may tag the set of requests with the corresponding assigned SFCs and feed the tagged requests to the assigned SFCs for handling. This adaptive Bayesian optimization process—which will be described in more detail hereinafter—may proceed in the above-described manner iteratively as new telemetry data is captured and new optimized SFC assignments are determined for subsequent network requests based on changes in network performance reflected in the new telemetry data.

Example aspects of the disclosed technology formulate SFC selection for an incoming network service request as a sequential decision problem according to which a device makes a sequence of decisions representing a sequence of optimal assignments of network requests to SFCs. In sequential decision making, a decision-maker—which in the network context may be a client device—makes a number of successive decisions without having complete information about the decision-making environment. The goal of the decision-maker agent is to arrive at a decision that is as close as possible, within constraints, to a decision that would have been made with complete knowledge of the environment. In SFC selection, a network device such as a client device or a server makes successive decisions by assigning incoming requests to SFCs over time and observes the end-to-end performance as the outcome of this assignment. For all successive decisions, the goal is to find assignments that result in best performance. Thus, each decision-making step becomes an optimization problem. In the context of SFC selection, however, the form of the objective function is unknown.

An approach for solving an objective function is to evaluate f(x) for various values of x, which can be selected using known methods such as steepest/stochastic gradient descent techniques. In some cases, it is not possible to express the objective function in the form of an equation because the derivatives and convex properties of f(x) are not known. In addition, it can be expensive to compute $f(x_i)$ for a single $x_i$. For example, in SFC selection, a solver-based approach would require the ability to evaluate the objective function f(x) for all possible values of x, where f(x) can only be obtained through real observations, which would be unduly burdensome. Rather, when the form of the objective function f(x) is unknown, an estimate of f(x) may be used to obtain a solution.

Moreover, in dynamic environments, the objective function can change over time, denoted as f(x, t). Tracking the solution to an objective function that changes over time requires modeling the problem as a dynamic optimization problem. While Bayesian optimization (BO) can be used to find the solution of an unknown objective function f(x) by learning an estimation of f(x) via sampling f(x) at carefully selected values of x, it is not sufficient for solving a dynamic optimization problem according to which the objective function changes over time, i.e., f(x, t). Example aspects of the disclosed technology solve this technical problem by utilizing a machine learning-based approach—in some aspects, adaptive Bayesian optimization (ABO)—to find an optimized solution to an unknown objective function that models the SFC selection process and that changes over time.

Prior to expanding on the details of an ABO-based approach that can be employed according to example aspects of the disclosed technology to optimize assignment of network requests to SFCs in a dynamically changing network environment, an overview of BO is presented. BO efficiently finds the optimum by evaluating f(x) a small number of times. For instance, let $D=_{1:n}=x_{1:n}, f(x_{1:n})$ denote n different values of x and the corresponding function evaluations at those values of x. Using these data points, BO produces an estimate of f(x) using GP priors represented by GP(m(x), k(x, x')), which assume that each f(x) is drawn from a Gaussian distribution having a mean and a variance defined by the GP mean and covariance functions, respectively. In BO, as f(x) is evaluated, the GP prior is updated at each iteration. The prior allows an acquisition function to identify the next best x to evaluate f(x). An upper confidence bound (UCB)-based acquisition function can be used that strikes a tradeoff between exploration and exploitation while guiding the search for the best $x_i$, i.e., the solution to the objective function. However, as noted above, BO cannot reliably determine the best $x_1$ if the objective function changes with time, i.e., is of the form f(x, t).

Example aspects of the disclosed technology utilize ABO to solve this technical challenge by assuming a time-varying GP prior, denoted as GP(m(x, t); k({x, t}, {x', t'}). More specifically, in example aspects, f(x, t) is modeled using spatial-temporal kernel functions in the GP prior, and the acquisition function is then modified for the time-varying GP prior. In some aspects, a time-varying UCB-based acquisition function can be used to select $x_i$ for a time-varying GP prior.

In example aspects of the disclosed technology, ABO is employed to determine an optimal assignment of requests to SFCs (x*), such that the evaluation of f(x, t) at time t results in an optimal solution. An optimal solution may be an assignment of requests to SFCs that seeks to minimize a network performance parameter such as request response time, latency, packet loss, or the like at time t, represented by the value of f(x, t). In other aspects, an optimal solution may be an assignment of requests to SFCs that seeks to maximize a network performance parameter such as bit rate, throughput, availability, or the like. According to example aspects, the explore and exploit strategy of ABO uses observational data to optimize request assignment. In particular, the ABO approach assumes an unknown objective function and learns the shape of the function through observational data. For instance, for a given request assignment $x_i$, SLO metrics such as request response time are measured, and a new $x_i$ is proposed based on past observations.

An ABO-based approach according to example aspects of the disclosed technology provides a number of technical solutions to technical problems associated with existing approaches to SFC selection such as a solver-based optimization approach. For instance, an ABO-based approach according to example aspects of the disclosed technology does not require extensive measurements of network/compute resources in order to evaluate the objective function for a specific request assignment $x_i$. Further, the dynamic nature of ABO allows it to track changes in the optimal request assignment x* over time, which existing SFC selections cannot do. Changes to the optimal request assignment may occur due to the underlying dynamics of resource availability caused by resource sharing among multiple network slices, changes to incoming request load, and so forth. Moreover, because ABO is computationally less expensive, it can be triggered more frequently, which can result in request routing at a finer time granularity.

Figure 3:
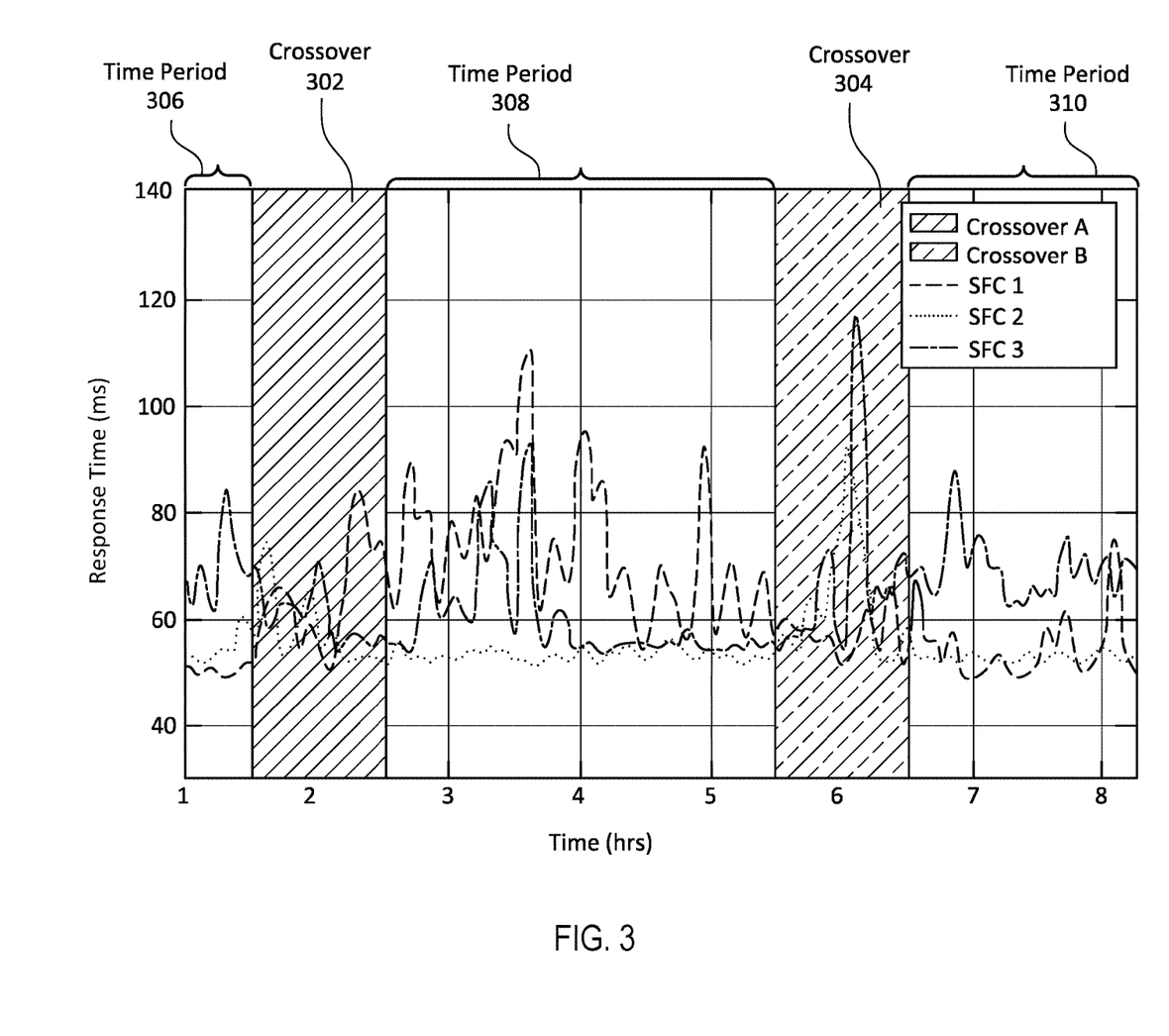
FIG. 3 illustrates different optimized SFC assignments during different time periods as the end-to-end network performance for different SFCs varies over time according to example aspects of the disclosed technology.

FIG. 3 illustrates a plot of the response time from an enterprise application as measured from user equipment (UE) using 3 different SFCs distributed across 3 different geographical regions. User equipment may include any of a variety of types of client devices such as smartphones, tablets, personal computers, wearable devices, or the like. As shown, there are multiple crossovers of the end-to-end response time between different SFCs. For example, SFC 1 initially performs better than SFC 2 and SFC 3. However, at crossover period 302, SFC 2 and SFC 3 begin performing significantly better than SFC 1. SFC 1 then exhibits the worst response time between crossover period 302 and crossover period 304. During crossover period 304, SFC 3 begins to exhibit the worst performance of the three SFCs.

The crossover periods 302, 304 indicate that there are dynamics in the end-to-end network performance such that there is no single SFC that results in the best end-to-end performance over an extended period of time. As such, dynamically selecting end-to-end SFCs over time for incoming requests in accordance with aspects of the disclosed technology can improve end-to-end network performance and ensure that SLOs are met for various network service types. According to aspects of the disclosed technology, the trained machine learning model disclosed herein may dynamically select SFC 1 to handle one or more incoming network service requests received during time period 306, but may dynamically assign SFC 2 rather than SFC 1 to incoming requests received during time period 308 because SFC 2 demonstrates the most optimized performance with respect to request response time during time period 308. The transition from SFC 1 to SFC 2 may occur at any point during the crossover period 302. During crossover period 304, SFC 1 again demonstrates superior performance as compared to the other SFCs. As such, SFC 1 may be assigned to incoming requests during crossover period 304. Then, the trained model may again switch to SFC 2 for handling requests received during time period 310. In this manner, the SFC assignment to incoming network service requests can dynamically adapt to changing performance characteristics for the SFCs over time.

Figure 4:
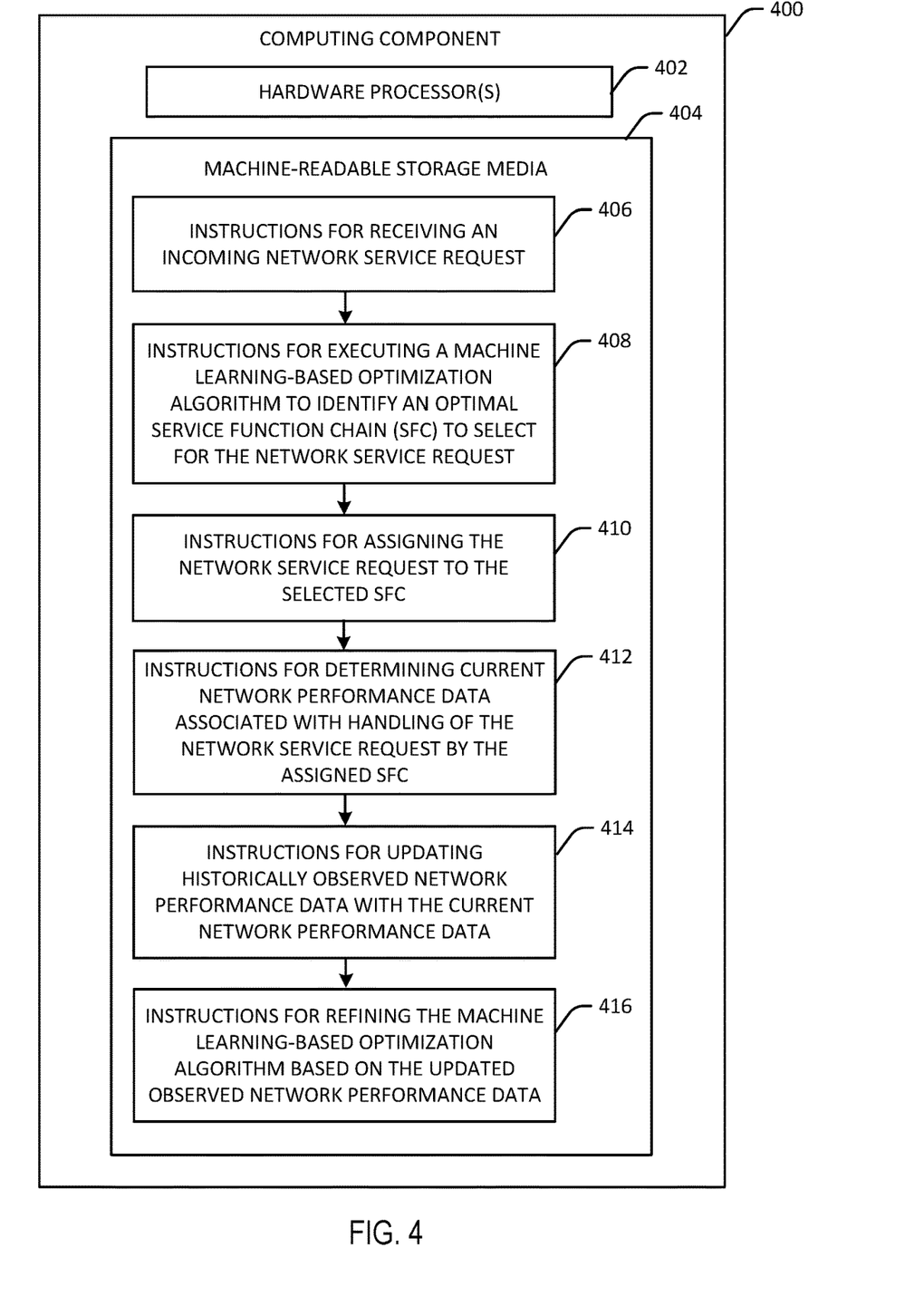
FIG. 4 depicts a set of executable instructions stored in machine-readable storage media that, when executed, cause an illustrative method to be performed for utilizing and refining a machine learning-based optimization algorithm to select an optimal SFC to which to assign an incoming network service request according to example aspects of the disclosed technology.
Figure 5:
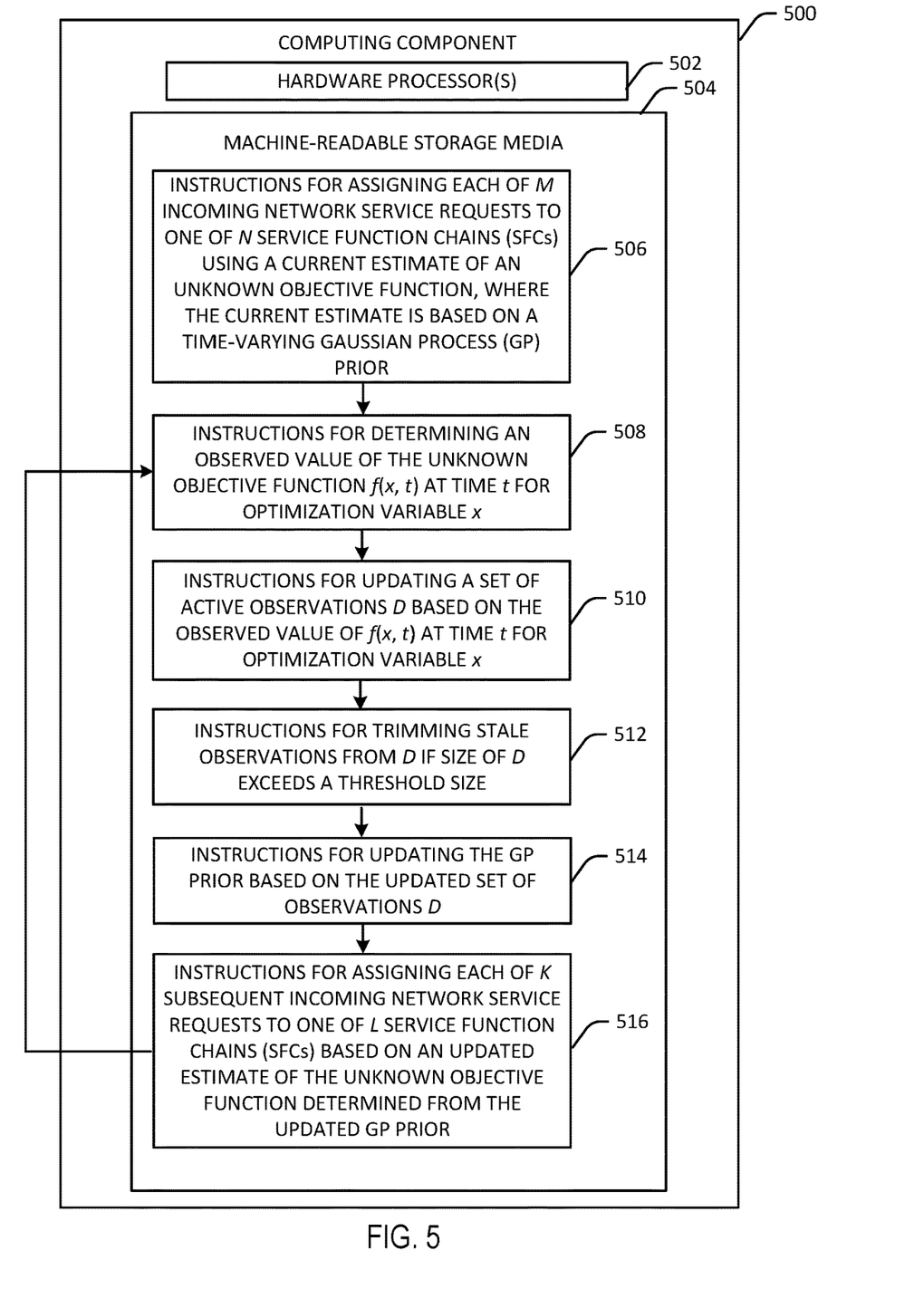
FIG. 5 depicts a set of executable instructions stored in machine-readable storage media that, when executed, cause an illustrative method to be performed for employing an adaptive Bayesian optimization approach to determine an optimal solution to an unknown objective function that changes over time so as to enable selection of an optimal SFC to which to assign an incoming network service request according to example aspects of the disclosed technology.

Various aspects of the disclosed technology will be now be described in even more detail in reference to FIGS. 4 and 5. FIG. 4 depicts a computing component 400 that includes one or more hardware processors 402 and machine-readable storage media 404 storing a set of machine-readable/machine-executable instructions. Similarly, FIG. 5 depicts a computing component 500 that includes one or more hardware processors 502 and machine-readable storage media 504 storing a set of machine-readable/machine-executable instructions. While the hardware processors 402, 502 may be referred to herein in the singular form or the plural form, in either case, it is intended to convey that one or more hardware processors may be provided. One or more of the computing components 400, 500 may be, for example, the computing system 600 depicted in FIG. 6. In some aspects, one or more of the computing components 400, 500 is a network device such as an a UE, an access point, a router or the like. In other example aspects, one or more of the computing components 400, 500 is a server, a server cluster, or the like. The hardware processors 402, 502 may include, for example, the processor(s) 604 depicted in FIG. 6 or any other processing unit described herein. The machine-readable storage media 404, 504 may include the main memory 606, the read-only memory (ROM) 608, the storage 610, or any other suitable machine-readable storage media described herein.

In some aspects, the instructions depicted in FIG. 4 and/or FIG. 5 as being stored on machine-readable storage media may be modularized into one or more computing engines/program modules. In particular, each such computing engine may include a set of machine-readable and machine-executable instructions, that when executed by a hardware processor, causes the hardware processor to perform corresponding tasks/processing. In some aspects, the set of tasks performed responsive to execution of the set of instructions forming a particular computing engine may be a set of specialized/customized tasks for effectuating a particular type/scope of processing. The aforementioned engines/program modules can be implemented in any combination of hardware, software, and/or firmware. In some aspects, these engines may be customized computer-executable logic implemented within a customized computing machine such as a customized field programmable gate array (FPGA) or an application specific integrated circuit (ASIC).

A system or device described herein as being configured to implement example aspects of the disclosed technology (e.g., the computing system 600) can include one or more processing circuits, each of which can include one or more processing units or cores. These processing circuit(s) (e.g., hardware processors 402, 502; processor(s) 604) may be configured to execute computer-executable code/instructions of various engines to cause input data contained in or referenced by the computer-executable program code/instructions to be accessed and processed by the processing unit(s)/core(s) to yield output data. It should be appreciated that any description herein of an engine performing a function inherently encompasses the function being performed responsive to computer-executable/machine-executable instructions of the engine being executed by a processing circuit.

The illustrative method embodied in the collection of machine-executable instructions depicted in FIG. 4 will now be described while occasionally referring to FIG. 2. The hardware processor 402 may execute instructions 406 for receiving an incoming network service request, which may be included among the network service requests 202. The hardware processor 402 may then execute instructions 408 to run a machine learning-based optimization algorithm to identify an optimal assignment of the incoming network request to a selected SFC. As described earlier, and as explained in more detail in reference to FIG. 5, the machine learning-based optimization algorithm may be an ABO algorithm capable of accounting for the time-varying nature of the unknown objective function that models the end-to-end network performance behavior. The hardware processor 402 may then execute instructions 410 for assigning the network service request to the identified optimal SFC. In particular, execution of instructions 410 may cause the network request assignment component 230 to assign the incoming network request to the SFC 208 identified as being an optimal SFC to handle the request. The network request assignment component 230 may inform the network slice controller 206 of the assignment in order to enable the controller 206 to update its routing policies so as to ensure that the selected SFC handles the assigned request. In some aspects, the incoming network service request received responsive to execution of instructions 406 may be received during a time period over which the set of network service requests 202 is received. In some aspects, an AFC assignment may include an assignment of each request in the set of network service requests 202 to a respective SFC 208.

Hardware processor 402 may execute instructions 412 to determine current network performance data associated with the handling of the network service request by the assigned SFC. In particular, execution of instructions 412 may cause the telemetry capture component 220 to capture various telemetry data via the service mesh layer 218. The telemetry data may include data relating to various network performance parameters associated with the selected SFC's handling of the assigned network service request. Such performance parameters may include, without limitation, packet loss, latency, request response time, bit rate, throughput, or the like.

The hardware processor 402 may then execute instructions 414 for updating historically observed network performance data with the current network performance data captured responsive to execution of the instructions 412. Historically observed network performance data may include any performance data associated with the handling of previously received network service requests by assigned SFCs. A data repository 224 storing active observation data may be updated to include the current network performance data. The updating may include maintaining the k most recent observations (e.g., the k most recent captured values of a particular performance parameter) in the active observation data repository 224 and deleting staler observations, for example. Thus, the active observation data may include the k most recent observations for each of one or more performance parameters.

The hardware processor 402 may execute instructions 416 for refining the machine learning-based optimization algorithm based on the updated network performance data stored in the active observation data repository 224. In particular, in some aspects, the GP estimation component 226 may update a Gaussian prior to reflect the updated observed network performance data, and the acquisition function execution component 230 may use the updated Gaussian prior when evaluating an acquisition function to determine the next optimal assignment of a network service request to an SFC.

The illustrative method performed responsive to execution of the collection of machine-executable instructions depicted in FIG. 5 will now be described while occasionally referring to FIG. 2. This illustrative method corresponds to a specific ABO-based implementation of the machine learning-based optimization algorithm referenced in FIG. 4. Pseudo-code for the ABO-based algorithm embodied in FIG. 5 is provided below.

---

M ← Number of incoming requests at time t
x ← Initial assignment of M requests to N SFCs,
where $x \in \mathbb{R}$ and $\Sigma_N x_1 = 1$
T, ActiveSet ← Time horizon, Number of most recent observations to
for t = 1, . . ., T do:
  Evaluate f(x, t);
  Update set of observations D with $\{x_t, f(x, t)\}$;
  Update GP(m(x), k(x, t)) using D;
  Choose next best x to evaluate;
  if Size of D > ActiveSet then;
    Trim Das D = D[size(D)− ActiveSet: Size(D)]

---

Referring now to FIG. 5, the hardware processor 502 may execute instructions 506 to cause each of M number of incoming network requests to be assigned to one of N SFCs using a current estimate of an unknown objective function f(x, t). This results in an initial service request-to-SFC assignment x. In some aspects, the optimization variable x is a vector of size N, where the ith element of the vector represents the fraction/percentage of requests assigned to the ith SFC. That is, the ith element of the vector may correspond to the ith SFC, and may indicate what fraction or percentage of the M requests in the set of incoming network service requests have been assigned to the ith SFC for the ith SFC to handle.

Then, the hardware processor 502 may execute instructions 508 for determining an observed value of the unknown objective function f(x, t) at time t for the optimization variable x. For instance, a particular network performance parameter such as the response time for a request assignment $x_t$ at time t may be determined. The response time can change over the course of successive observations given the dynamics in network conditions, and the ABO-based approaches described herein according to aspects of the disclosed technology can account for these dynamic network conditions and continue to determine the optimal SFC selection despite the changing network conditions.

After observing the value of the unknown objective function f(x, t) at time t for optimization variable x (e.g., the request response times for the initial assignment x), the hardware processor 502 executes instructions 510 to update a set of observations D with the observed value of f(x, t) at time t. In particular, the ABO component 222 includes an active observation data repository 224 that maintains an active set of observations in D, where this active set represents the most recent observations that should be considered for GP model fitting. As such, staler observations are discarded from the set D over time. Staler observations refers to observations that were made more than some threshold period of time prior to a current time. Thus, the hardware processor 502 may execute instructions 512 to trim stale observations from the set D if the size of D exceeds a threshold size. In some aspects, maintaining a limited active set of observations allows the ABO component 222 to achieve a forgetting-remembering tradeoff. Since, ABO uses a Gaussian process as a surrogate function to model f(x, t), staler observations can skew the estimate of f(x, t). That is, too many stale observations can make the estimate of f(x, t) inaccurate, particularly if f(x, t) has changed significantly—due to its time-varying characteristics—from when the stale observations were first made. Therefore, it is important to navigate the tradeoff between discarding stale samples of f(x) to obtain a better estimate of the time-varying unknown objective function f(x, t) and retaining enough observations to enable optimizing the unknown objective function in the first place.

The hardware processor 502 may then execute instructions 514 for updating the GP prior, i.e., GP(m(x), k(x, t)) based on the updated set of active observations D. In particular, execution of the instructions 514 may cause the Gaussian process estimation component 226 to generate an updated GP prior based on the updated set of active observations D. The hardware processor 502 may then execute instructions 516 for assigning each of K subsequent incoming network service requests to one of L SFCs based on an updated estimate of the unknown objective function determined from the updated GP prior. In particular, execution of the instructions 516 may cause the acquisition function execution component 228 to determine an updated estimate of f(x, t) based on the updated GP prior. The set of instructions can then be executed iteratively beginning with instructions 508 to refine, over time, the ABO algorithm's estimate of the time-varying unknown objective function.

Figure 6:
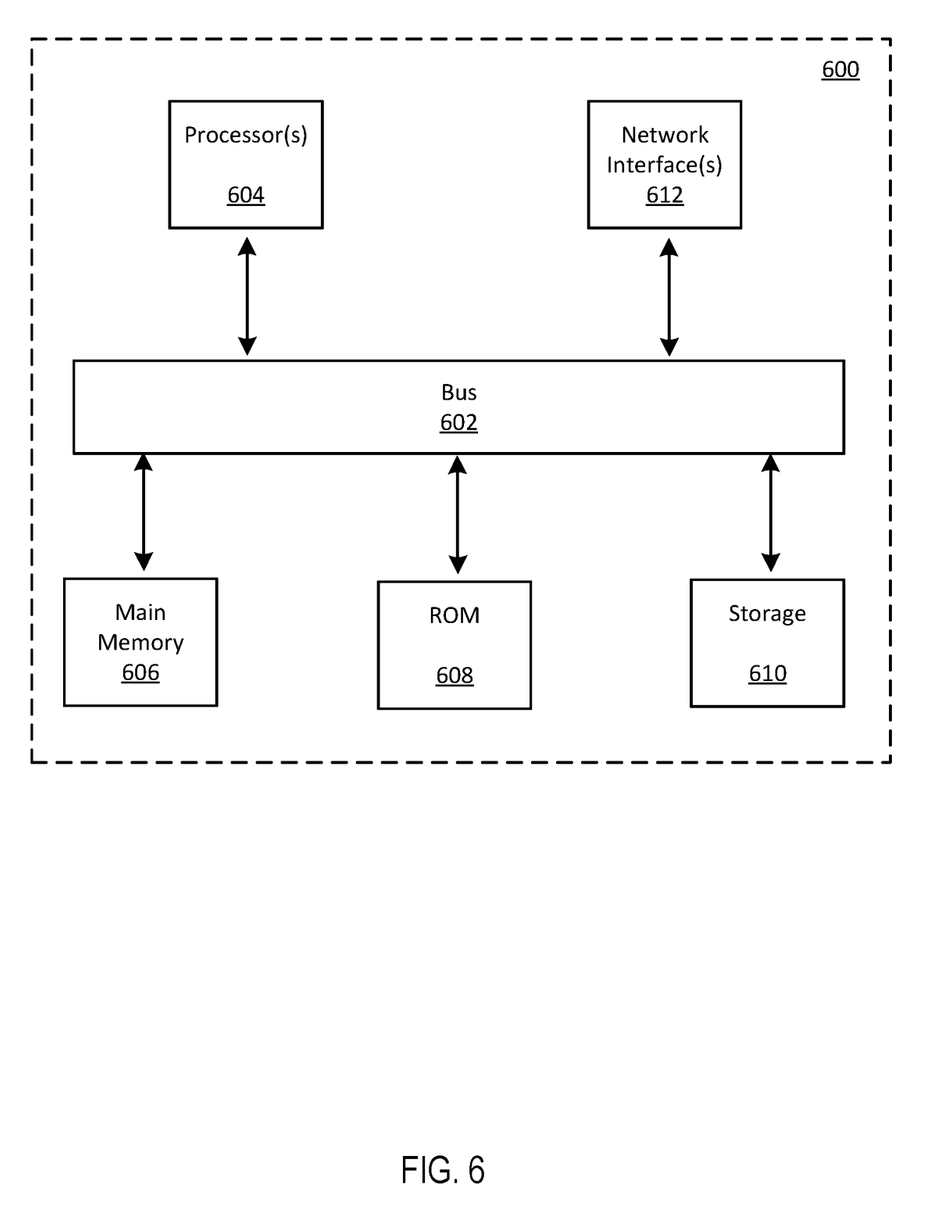
FIG. 6 is an example computing component that may be used to implement various features of example aspects of the disclosed technology.

FIG. 6 depicts a block diagram of an example computer system 600 in which various of the aspects described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one aspect, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative aspects, hard-wired circuitry may be used in place of or in combination with software instructions.

The term "non-transitory media," and similar terms such as machine-readable storage media, as used herein, refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example aspects. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain aspects include, while other aspects do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A computer-implemented method, comprising:
   collecting telemetry data indicative of a set of one or more network performance parameters for a mobile communications network;
   selecting a network performance parameter;
   training, based on the collected telemetry data, a machine learning model to determine a service function chain (SFC) that optimizes the selected network performance parameter for a given incoming network service request;
   receiving a set of incoming network service requests including at least a first network service request and a second network service request;
   utilizing the trained machine learning model to identify a set of SFCs that optimizes the selected network performance parameter for the set of incoming network service requests, the set of SFCs including a first SFC that optimizes the selected performance parameter with respect to the first network service request and a second SFC different from the first SFC that optimizes the selected performance parameter with respect to the second network service request;
   assigning the set of incoming network service requests to the set of SFCs;
   determining a current value of the selected network performance parameter associated with the first SFC handling the first network service request; and updating a set of historically observed values of the selected network performance parameter by including the current value in the set of historically observed values.

2. The computer-implemented method of claim 1, wherein the first SFC optimizes the selected network performance parameter for the first network service request by minimizing or maximizing the selected network performance parameter during handling of the first network service request.

3. The computer-implemented method of claim 2, wherein the selected network performance parameter is a request response time, and wherein the first SFC minimizes the request response time for the first network service request.

4. The computer-implemented method of claim 1, wherein training the machine learning model comprises executing an adaptive Bayesian optimization algorithm that optimizes an unknown objective function.

5. The computer-implemented method of claim 4, wherein the unknown objective function represents the selected network performance parameter over time as a function of assignment of the set of incoming network service requests to the set of SFCs.

6. The computer-implemented method of claim 5, wherein the assignment of the set of incoming network service requests to the set of SFCs is a vector, and wherein each element of the vector represents a fraction of the set of incoming network service requests assigned to a particular SFC of the set of SFCs, and wherein a first element of the vector is a fraction of the set of network service requests represented by a subset of network service requests assigned to the first SFC.

7. The computer-implemented method of claim 1, wherein updating the set of historically observed values of the selected network performance parameter comprises:
   determining that a size of the set of historically observed values exceeds a threshold size; and
   removing one or more stale values from the set of historically observed values.

8. The computer-implemented method of claim 7, wherein the one or more stale values comprise one or more values in the set of historically observed values that were observed more than a threshold amount of time prior to a current time.

9. The computer-implemented method of claim 7, further comprising:
   refining the trained machine learning model based on the updated set of historically observed values.

10. The computer-implemented method of claim 9, wherein refining the trained machine learning model comprises:
    updating a Gaussian process (GP) prior based on the updated set of historically observed values; and
    determining, based on the updated GP prior, an updated estimate of a time-varying unknown objective function being estimated by the machine learning model.

11. The computer-implemented method of claim 10, wherein the set of incoming network service requests is a first set of incoming network service requests received during a first time period and the set of SFCs is a first set of SFCs, the method further comprising:
    receiving a second set of incoming network service requests during a second time period subsequent to the first time period, the second set of incoming network service requests including a third network service request having the same network service type as the first network service request;
    utilizing the refined trained machine learning model to identify a second set of SFCs that optimizes the selected network performance parameter for the second set of incoming network service requests; and
    assigning the second set of incoming network service requests to the second set of SFCs, wherein assigning comprises assigning a third SFC to the third network service request that is different from the first SFC.

12. The computer-implemented method of claim 11, wherein an optimized value of the unknown objective function changes between the first time period and the second time period based on dynamic network conditions.

13. The computer-implemented method of claim 1, wherein the first SFC comprises a first chain of virtual network function (VNF) instances and the second SFC comprises a second chain of VNF instances, and wherein at least one VNF instance in the first chain is replicated in the second chain.

14. A non-transitory computer readable medium storing program instructions that, when executed by a processor, cause operations to be performed comprising:
    receiving a set of incoming network service requests;
    capturing telemetry data indicative of one or more network performance parameters over time, the telemetry data indicating that network performance characteristics have changed since one or more prior network service requests were received;
    executing, based on the captured telemetry data, a machine learning-based algorithm to identify an optimal assignment of the set of incoming network service requests to a set of service function chains (SFCs), wherein the identified optimal assignment assigns one or more network service requests in the incoming set of network service requests to a first SFC in the set of SFCs, wherein a prior assignment assigns the one or more prior network service requests to a second SFC, and wherein the first SFC is different from the second SFC, wherein the first SFC comprises a first chain of virtual network function (VNF) instances and the second SFC comprises a second chain of VNF instances, and wherein at least one VNF instance in the first chain is replicated in the second chain; and
    updating network routing policies to implement the optimal assignment.

15. The non-transitory computer readable medium of claim 14, wherein executing the machine learning-based algorithm to identify the optimal assignment comprises determining an assignment of the set of incoming network service requests to the set of SFCs that optimizes a selected network performance parameter based on a current optimal value of a time-varying objective function that models dynamically changing network conditions.

* * * * *